(12) United States Patent
Shimmoto

(10) Patent No.: US 9,304,957 B2
(45) Date of Patent: Apr. 5, 2016

(54) IMAGE PROCESSING METHOD, IMAGE PROCESSING APPARATUS, AND CONTROL PROGRAM

(71) Applicant: Takafumi Shimmoto, Kanagawa (JP)

(72) Inventor: Takafumi Shimmoto, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 264 days.

(21) Appl. No.: 13/724,608

(22) Filed: Dec. 21, 2012

(65) Prior Publication Data

US 2013/0166792 A1  Jun. 27, 2013

(30) Foreign Application Priority Data

Dec. 27, 2011  (JP) ................. 2011-285361

(51) Int. Cl.
*G06F 13/28* (2006.01)
(52) U.S. Cl.
CPC ...................... *G06F 13/28* (2013.01)
(58) Field of Classification Search
None
See application file for complete search history.

(56) References Cited

U.S. PATENT DOCUMENTS

| 6,323,867 | B1* | 11/2001 | Nookala et al. ............. 710/52 |
| 7,389,038 | B1* | 6/2008 | Watanabe et al. ............. 386/239 |
| 2003/0204634 | A1 | 10/2003 | Pinkerton et al. |
| 2005/0091412 | A1 | 4/2005 | Pinkerton et al. |
| 2006/0069792 | A1 | 3/2006 | Pinkerton et al. |

FOREIGN PATENT DOCUMENTS

| JP | 2000-115249 A | 4/2000 |
| JP | 2000-261515 | 9/2000 |
| JP | 2004-172869 A | 6/2004 |
| JP | 2006-109374 A | 4/2006 |
| JP | 2007-27951 A | 2/2007 |
| JP | 3966307 | 6/2007 |
| JP | 2009-055133 | 3/2009 |
| JP | 4327496 | 6/2009 |

OTHER PUBLICATIONS

Office Action issued Aug. 18, 2015 in Japanese Patent Application No. 2011-285361.

* cited by examiner

*Primary Examiner* — Idriss N Alrobaye
*Assistant Examiner* — Dayton Lewis-Taylor
(74) *Attorney, Agent, or Firm* — Oblon, McClelland, Maier & Neustadt, L.L.P.

(57) ABSTRACT

An image processing method includes: dividing received data into a header and a body; and writing the data in at least one buffer through a direct memory access (DMA) transfer.

9 Claims, 16 Drawing Sheets

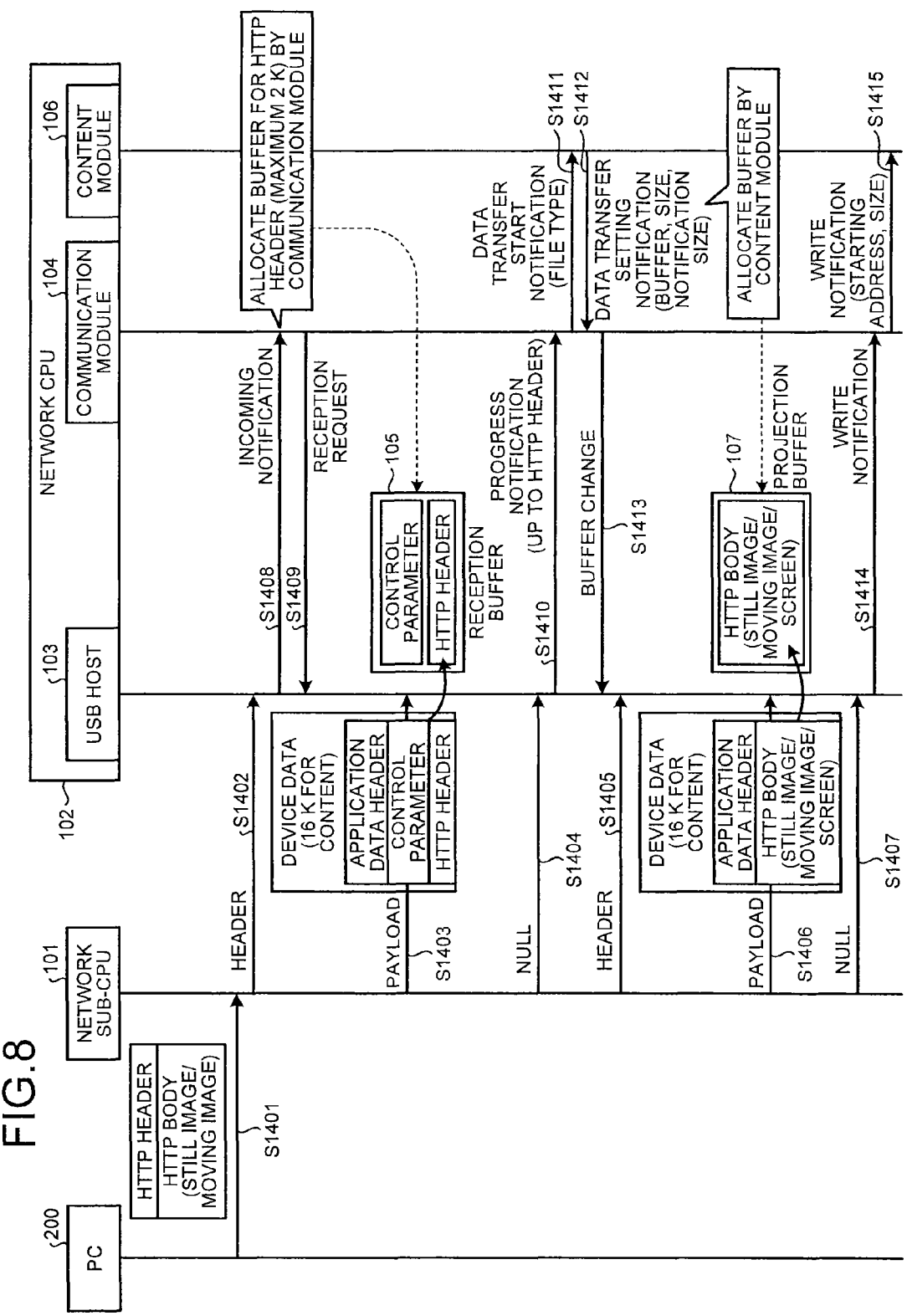

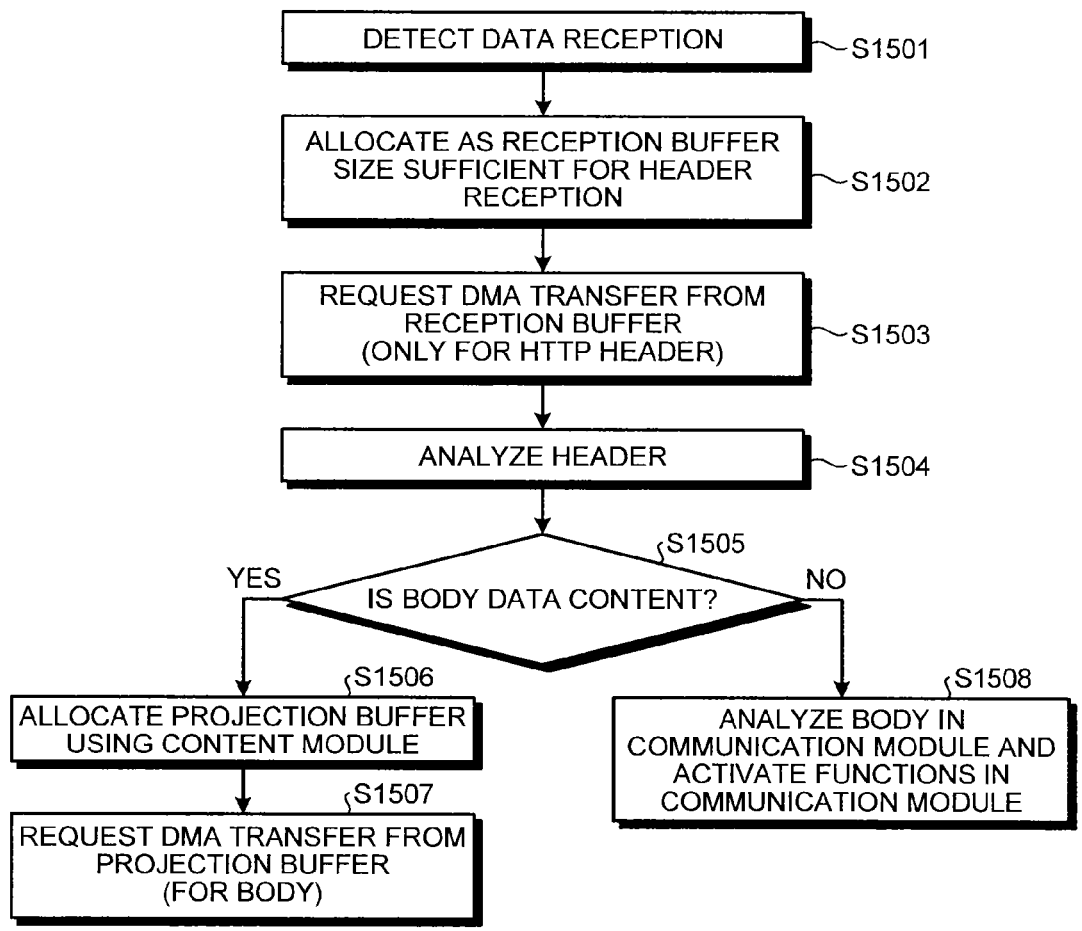

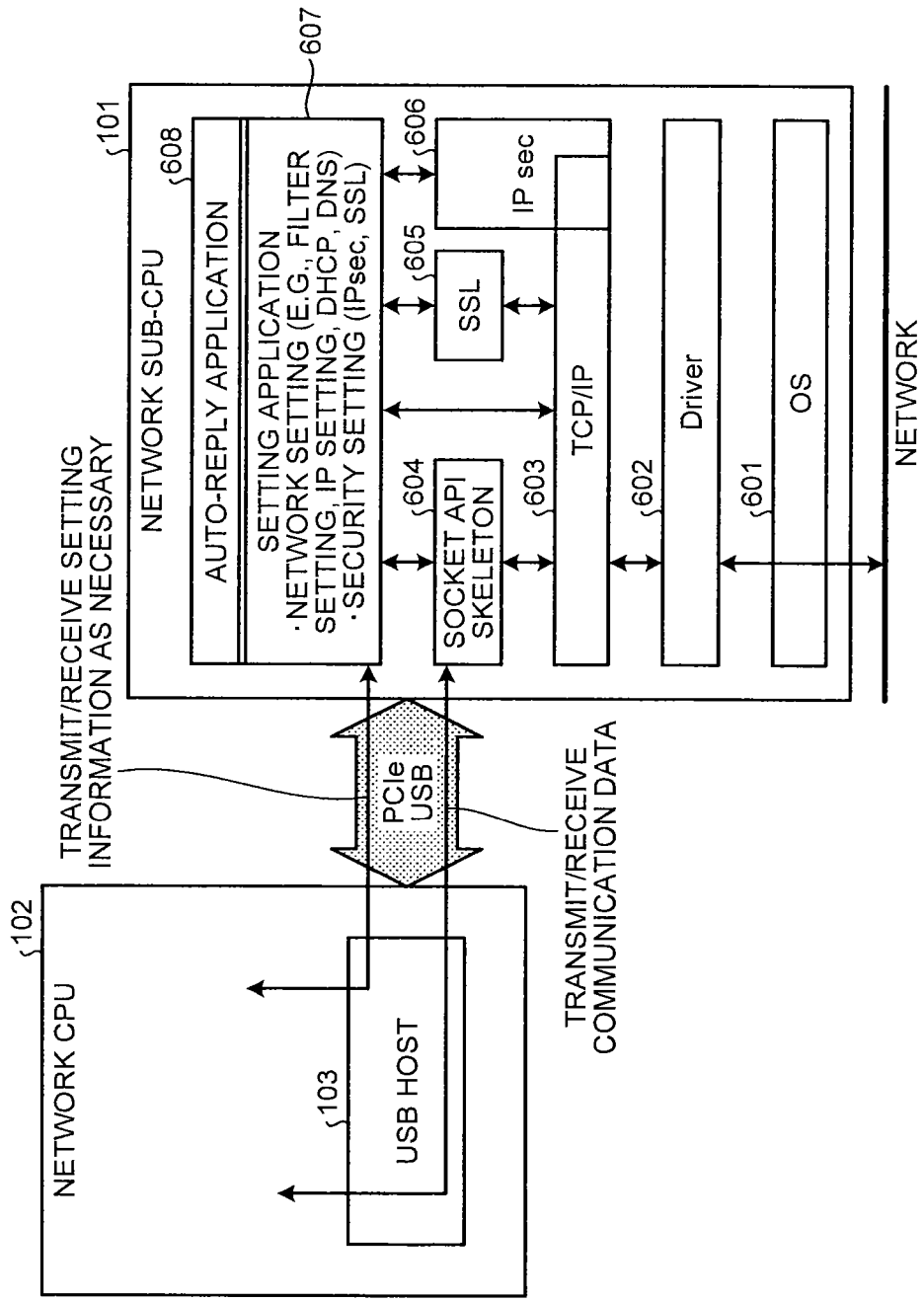

US 9,304,957 B2

IMAGE PROCESSING METHOD, IMAGE PROCESSING APPARATUS, AND CONTROL PROGRAM

CROSS-REFERENCE TO RELATED APPLICATIONS

The present application claims priority to and incorporates by reference the entire contents of Japanese Patent Application No. 2011-285361 filed in Japan on Dec. 27, 2011.

BACKGROUND OF THE INVENTION

1. Field of the Invention

The present invention relates to an image processing method, an image processing apparatus, and a control program.

2. Description of the Related Art

An image processing apparatus that receives and analyzes data transmitted over a network and projects image data as an optical image has been proposed.

A known image processing apparatus of this kind performs network processing at high speeds (see, for example, Japanese Patent Application Laid-open No. 2009-055133).

The invention disclosed in Japanese Patent Application Laid-open No. 2009-055133 is concerned with "a communication control apparatus, a communication control method, and a communication control program" and an object of the invention is to reduce processing load on a processor. The communication control apparatus disclosed in Japanese Patent Application Laid-open No. 2009-055133 includes a protocol processing circuit, a protocol processing unit, an interface object, a packet determination unit, a lower hardware protocol layer transfer unit, and a lower protocol layer transfer unit. The protocol processing circuit is a hard-wired circuit and performs protocol analysis processing on communication data. The protocol processing unit performs protocol analysis processing on communication data. The interface object performs communication control of communication data for a plurality of network devices. The packet determination unit determines for each network device whether protocol analysis processing for communication data is to be performed by the protocol processing circuit, based on data traffic of the relevant network device. The lower hardware protocol layer transfer unit transfers communication data to the protocol processing circuit, if the packet determination unit determines that protocol analysis processing is to be performed by the protocol processing circuit. The lower protocol layer transfer unit transfers communication data to the protocol processing unit, if the packet determination unit determines that protocol analysis processing is not to be performed by the protocol processing circuit.

That is, the invention disclosed in Japanese Patent Application Laid-open No. 2009-055133 divides hardware into two different pieces to thereby achieve faster processing.

The technique described above, however, has room for improvement on image display speed even with the faster communication speed.

There is a need to provide an image processing method, an image processing apparatus, and a control program that offer high communication speed and high image display speed.

SUMMARY OF THE INVENTION

It is an object of the present invention to at least partially solve the problems in the conventional technology.

An image processing method includes: dividing received data into a header and a body; and writing the data in at least one buffer through a direct memory access (DMA) transfer.

An image processing apparatus includes: a network board that analyzes received data and outputs image data; and a projection unit that projects the image data output from the network board as an optical image. The network board includes: a division unit that divides the received data into a header and a body; a writing unit that writes the data in at least one buffer through a direct memory access (DMA) transfer.

A computer program product includes a non-transitory computer-usable medium having computer-readable program codes embodied in the medium and for a computer of an image processing apparatus. The image processing apparatus includes: a network board that analyzes received data and outputs image data; and a projection unit that projects the image data output from the network board as an optical image. The program codes when executed cause the computer to execute: dividing, by a division unit, the received data into a header and a body; writing, by a writing unit, the data in at least one buffer through a direct memory access (DMA) transfer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is an exemplary sequence diagram illustrating operation of the image processing apparatus illustrated in FIG. 7;

FIG. 9 is an exemplary flowchart illustrating operation of a communication module 104 illustrated in FIG. 8;

FIG. 16 is a conceptual diagram illustrating an internal configuration of a network sub-CPU 101.

DETAILED DESCRIPTION OF THE PREFERRED EMBODIMENTS

Image processing apparatuses according to embodiments of the present invention will be described below with reference to the accompanying drawings.

First Embodiment

Figure 1:
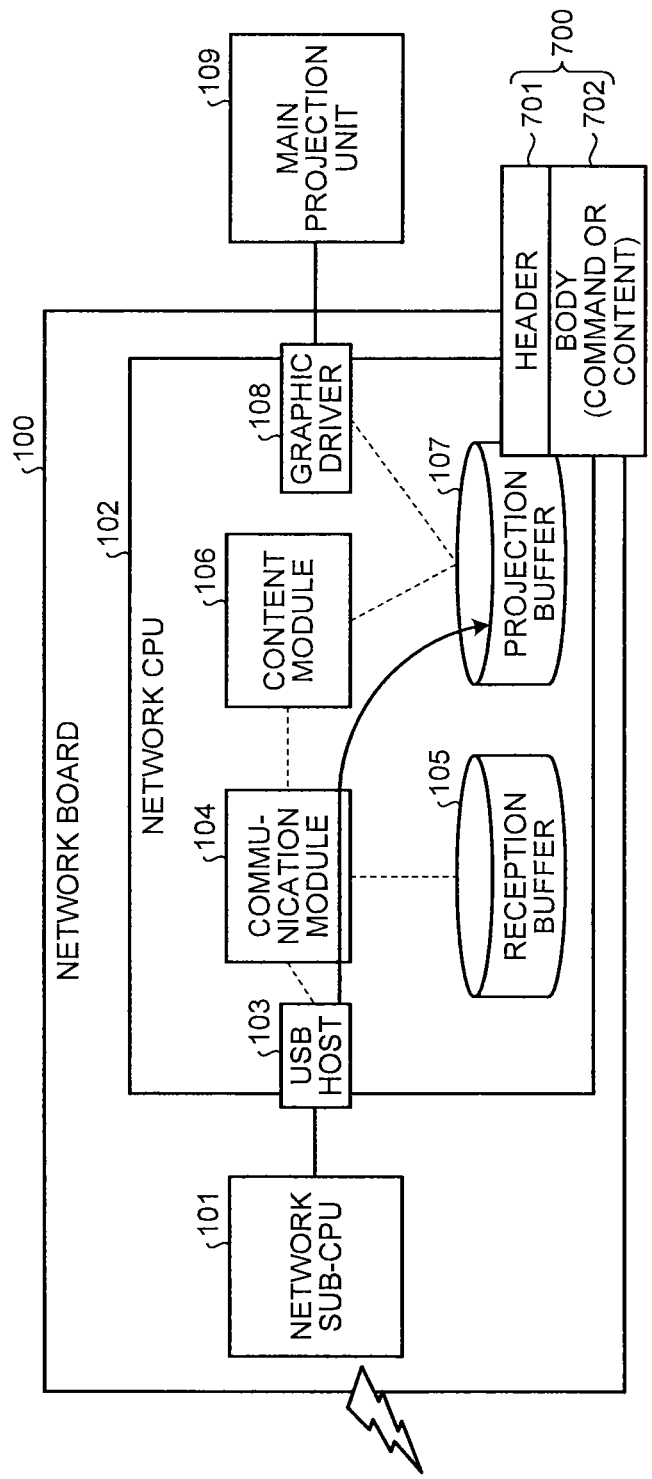
FIG. 1 is a conceptual diagram illustrating an image processing apparatus according to an embodiment of the present invention.

FIG. 1 is a conceptual diagram illustrating an image processing apparatus according to a first embodiment of the present invention.

FIG. 1 illustrates that the image processing apparatus illustrated therein performs a direct memory access (DMA) transfer of all data from a universal serial bus (USB) host 103 to a projection buffer 107.

A network board 100 illustrated in FIG. 1 includes a network sub-central processing unit (CPU) 101 as an analyzing unit and a network CPU 102.

The network CPU 102 includes the USB host 103 as a division unit, a communication module 104 as an analyzing unit/selection unit, a reception buffer 105, a content module 106 as a writing unit, the projection buffer 107, and a graphic driver 108.

Data (received data) 700 including a "header" 701 and a "body" 702 is divided into the "header" 701 and the "body" 702. The "header" 701 describes the type of data contained in the "body" 702.

The received data 700 may be either a command or content, and is not always projection data. This is because the received data 700 also contains unnecessary data ("header" 701) and cannot be directly projected by a main projection unit 109.

Figure 2:
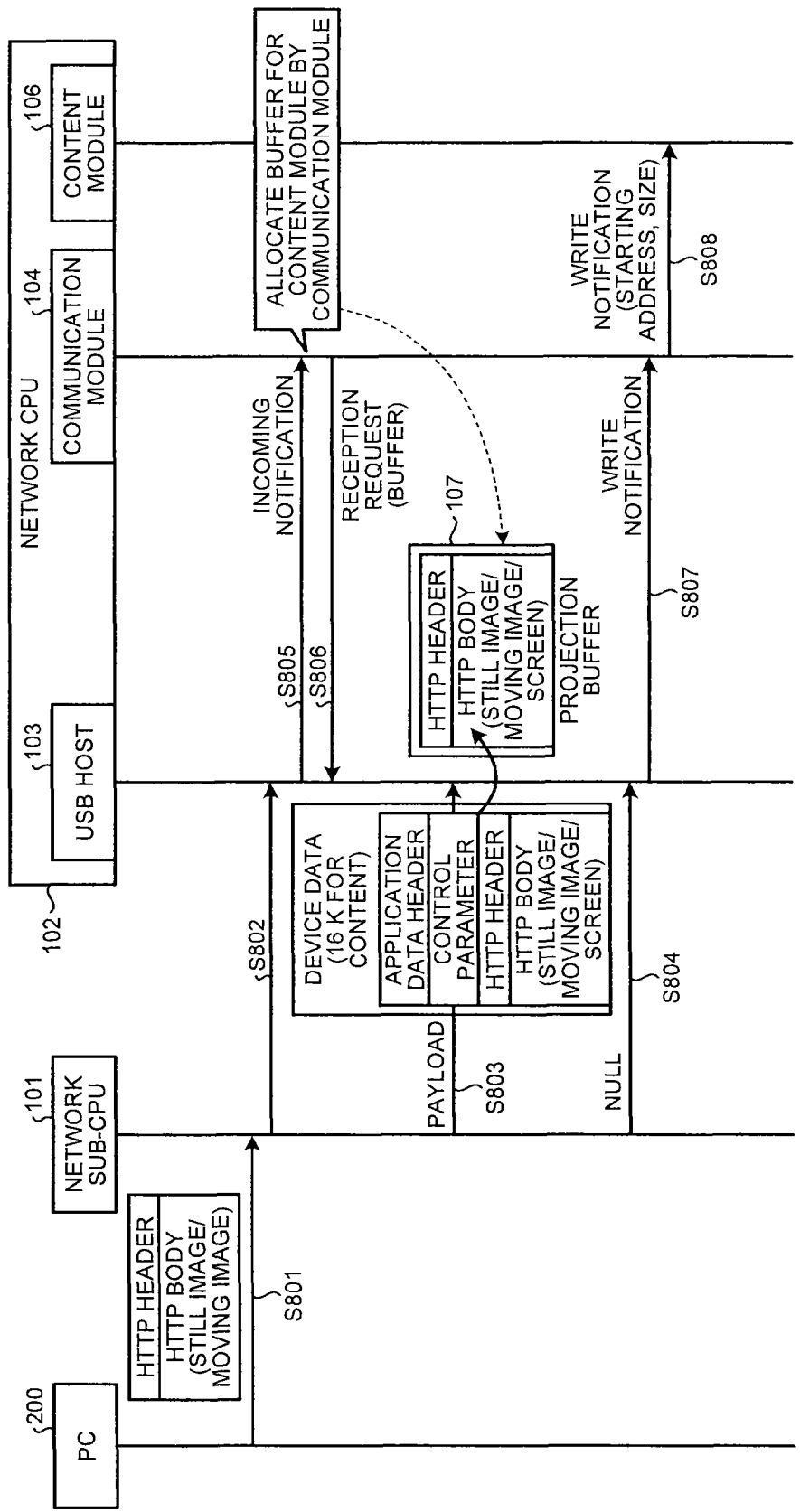
FIG. 2 is an exemplary sequence diagram illustrating operation of the image processing apparatus illustrated in FIG. 1.

FIG. 2 is an exemplary sequence diagram illustrating operation of the image processing apparatus illustrated in FIG. 1.

When receiving the data 700 from a personal computer (hereinafter referred to as a PC) 200 connected to the network sub-CPU 101 (S801), the network sub-CPU 101 makes an incoming notification to the USB host 103 of the network CPU 102 (S802), sending a payload and a NULL to the USB host 103 (S803, S804).

It is noted that the data 700 includes an HTTP header 701 and an HTTP body (a still image, a moving image) 702. In addition, device data as the payload (e.g. 16 KB in the case of content) includes an application data header, a control parameter, an HTTP header, and an HTTP body (still image/moving image/screen).

When the USB host 103 makes an incoming notification to the communication module 104 (S805), the communication module 104 allocates a buffer for the content module 106 and the communication module 104 makes a reception request (buffer) to the USB host 103 (S806).

At this time, the HTTP header and the HTTP body out of the device data are written in the projection buffer 107.

When the USB host 103 makes a write notification to the communication module 104 (S807), the communication module 104 makes a write notification (starting address, size) to the content module 106 (S808).

In the above, according to the present embodiment, an image processing apparatus that offers high communication speed and high image display speed can be achieved.

Second Embodiment

Figure 3:
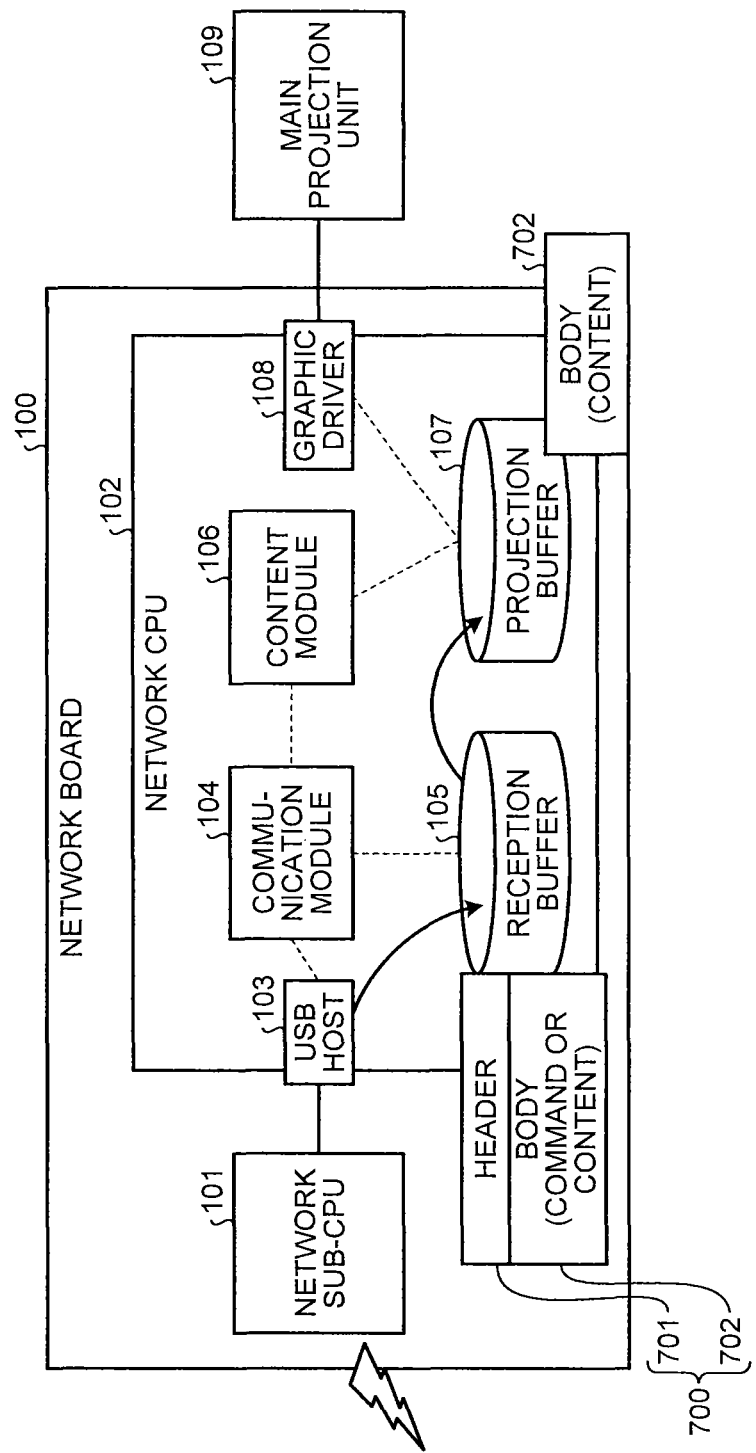
FIG. 3 is a conceptual diagram illustrating an image processing apparatus according to a further embodiment of the present invention.

FIG. 3 is a conceptual diagram illustrating an image processing apparatus according to a further embodiment of the present invention.

FIG. 3 illustrates that the image processing apparatus illustrated therein performs a DMA transfer of all data directly from a USB host 103 to a reception buffer 105.

The image processing apparatus illustrated in FIG. 3 differs from the image processing apparatus illustrated in FIG. 1 in that, after an analysis of a header, data is written in a projection buffer if the data contained in a body is "content".

Similarly to the configuration illustrated in FIG. 1, the image processing apparatus illustrated in FIG. 3 includes a network board 100 and a main projection unit 109. The network board 100 includes a network sub-CPU 101 and a network CPU 102. The network CPU 102 includes the USB host 103, a communication module 104, the reception buffer 105, a content module 106, a projection buffer 107, and a graphic driver 108.

Each element has the same function as that described above and descriptions for those functions will be omitted.

Figure 4:
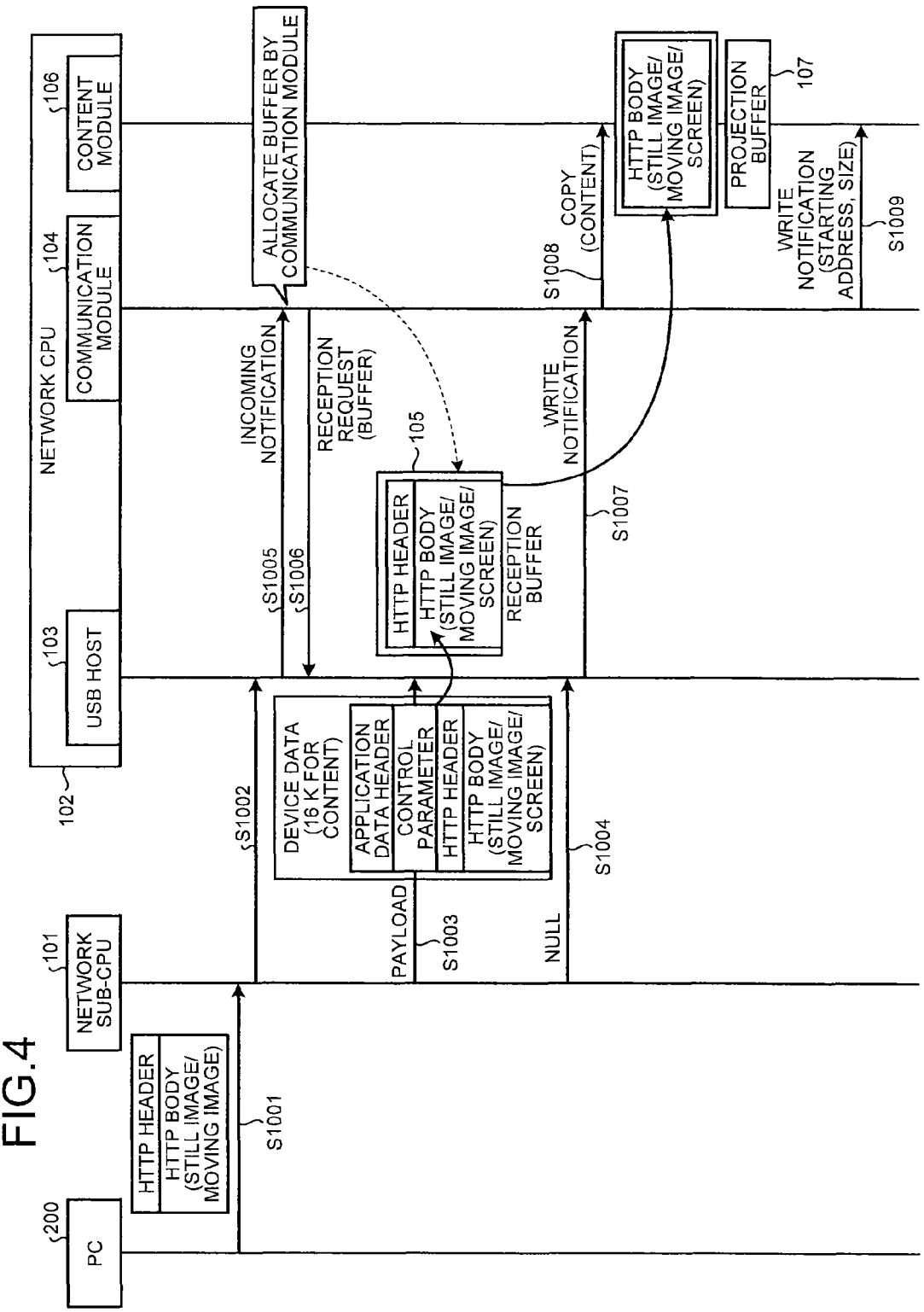
FIG. 4 is an exemplary sequence diagram illustrating operation of the image processing apparatus illustrated in FIG. 3.

FIG. 4 is an exemplary sequence diagram illustrating operation of the image processing apparatus according to the second embodiment of the present invention illustrated in FIG. 3.

When receiving data 700 from a PC 200 connected to the network sub-CPU 101 (S1001), the network sub-CPU 101 makes an incoming notification to the USB host 103 of the network CPU 102 (S1002). After the incoming notification, the network sub-CPU 101 sends a payload and a NULL to the USB host 103 (S1003, S1004).

Device data as the payload (e.g. 16 KB in the case of content) includes an application data header, a control parameter, an HTTP header, and an HTTP body (still image/moving image/screen).

When the USB host 103 makes an incoming notification to the communication module 104 of the network CPU 102 (S1005), the communication module 104 allocates a buffer and the communication module 104 sends a reception request (buffer) to the USB host 103 (S1006).

At this time, the header and the HTTP body (still image/moving image/screen) out of the device data are written in the reception buffer 105. After the write, the USB host 103 makes a write notification to the communication module 104 (S1007).

The communication module 104 sends a copy (content data) to the content module 106 (S1008).

The content module 106 writes the HTTP body (still image/moving image/screen) out of the data written in the reception buffer 105, in the projection buffer 107.

The communication module 104 makes a write notification (starting address, size) to the content module 106 (S1009).

In the above, according to the present embodiment, an image processing apparatus that offers high communication speed and high image display speed can be achieved.

Third Embodiment

Figure 5:
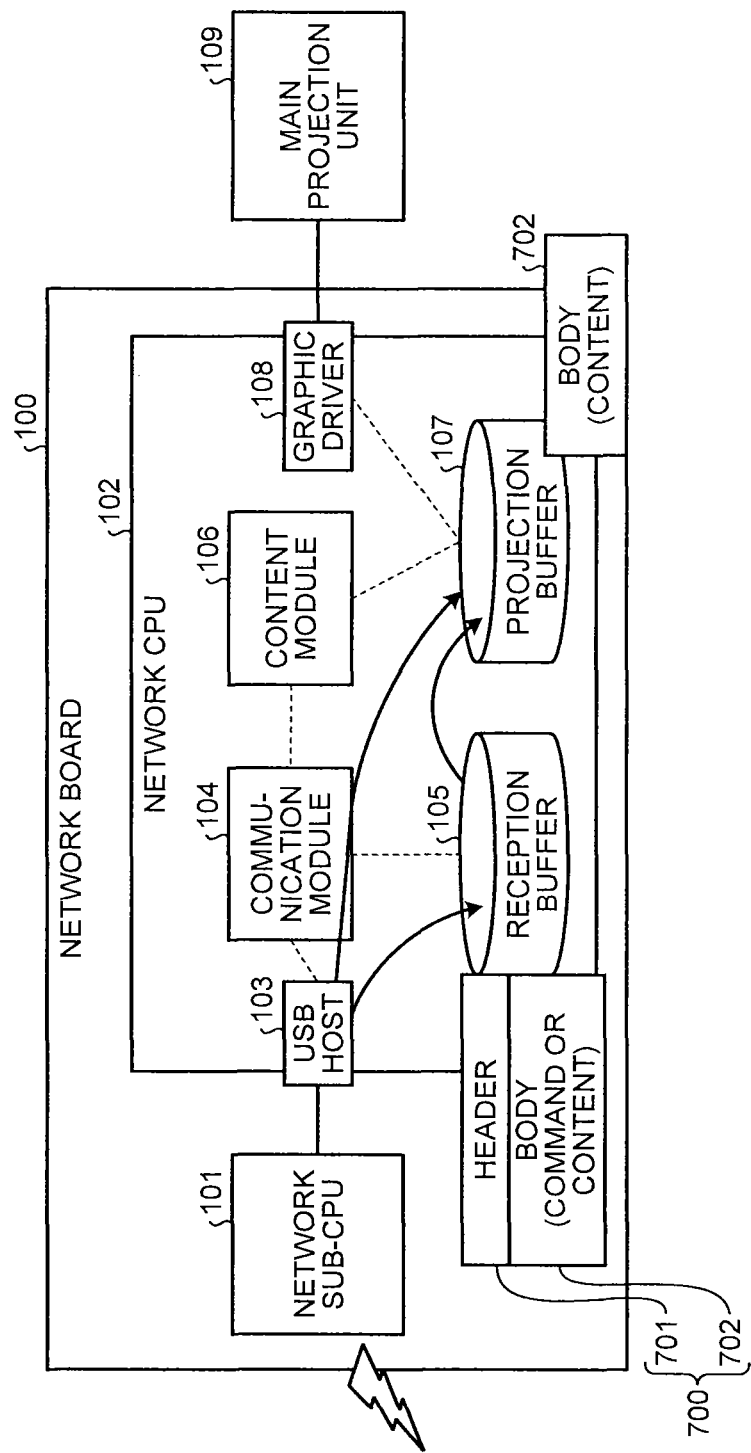
FIG. 5 is a conceptual diagram illustrating an image processing apparatus according to a further embodiment of the present invention.

FIG. 5 is a conceptual diagram illustrating an image processing apparatus according to a further embodiment of the present invention.

FIG. 5 illustrates that the image processing apparatus illustrated therein performs a DMA transfer of part (having a size sufficient for header analysis) of data directly from a USB host 103 to a reception buffer 105.

The image processing apparatus illustrated in FIG. 5 differs from the image processing apparatus illustrated in FIG. 1 in that, after an analysis of a header, a body of data written in the reception buffer 105 is written in a projection buffer 107 if data contained in the body is "content".

Similarly to the configuration described earlier, the image processing apparatus illustrated in FIG. 5 includes a network board 100 and a main projection unit 109. The network board 100 includes a network sub-CPU 101 and a network CPU 102. The network CPU 102 includes the USB host 103, a communication module 104, the reception buffer 105, a content module 106, the projection buffer 107, and a graphic driver 108.

Each element has the same function as that described earlier and descriptions for those functions will be omitted.

Figure 6:
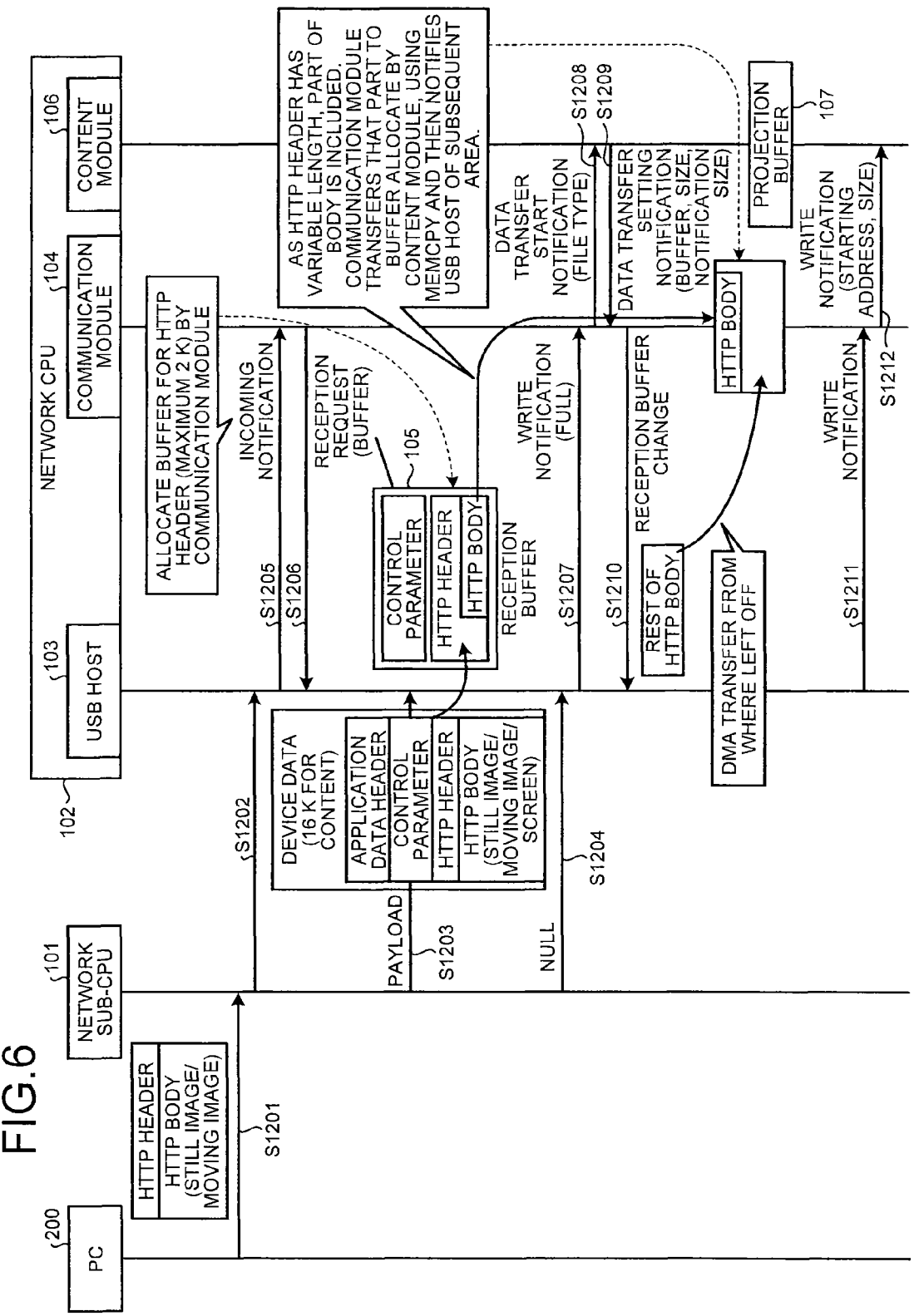
FIG. 6 is an exemplary sequence diagram illustrating operation of the image processing apparatus illustrated in FIG. 5.

FIG. 6 is an exemplary sequence diagram illustrating operation of the image processing apparatus according to the third embodiment of the present invention illustrated in FIG. 5.

When receiving data 700 from a PC 200 connected to the network sub-CPU 101 (S1201), the network sub-CPU 101 makes an incoming notification to the USB host 103 of the network CPU 102 (S1202).

After the incoming notification, the network sub-CPU 101 sends a payload and a NULL to the USB host 103 (S1203, S1204).

Device data as the payload (e.g. 16 KB in the case of content) includes an application data header, a control parameter, an HTTP header, and an HTTP body (still image/moving image/screen).

The USB host 103 makes an incoming notification to the communication module 104 (S1205) and the communication module 104 allocates a buffer for the HTTP header (maximum 2 KB).

Having received the incoming notification, the communication module 104 makes a reception request to the USB host 103 (S1206).

The control parameter, the HTTP header, and the HTTP body out of the device data are written in the reception buffer 105 and a write notification (FULL) is made from the USB host 103 to the communication module 104 (S1207).

When the communication module 104 makes a data transfer start notification (file type) to the content module 106, the content module 106 sends a data transfer setting notification (buffer, size, notification size) to the communication module 104 (S1209).

When the communication module 104 sends a reception buffer change to the USB host 103 (S1210), the rest of the HTTP body is subject to a DMA transfer to the projection buffer 107 from where left off.

When the USB host 103 makes a write notification to the communication module 104 (S1211), the communication module 104 sends a write notification (starting address, size) to the content module 106 (S1212).

In the above, according to the present embodiment, an image processing apparatus that offers high communication speed and high image display speed can be achieved.

Fourth Embodiment

Figure 7:
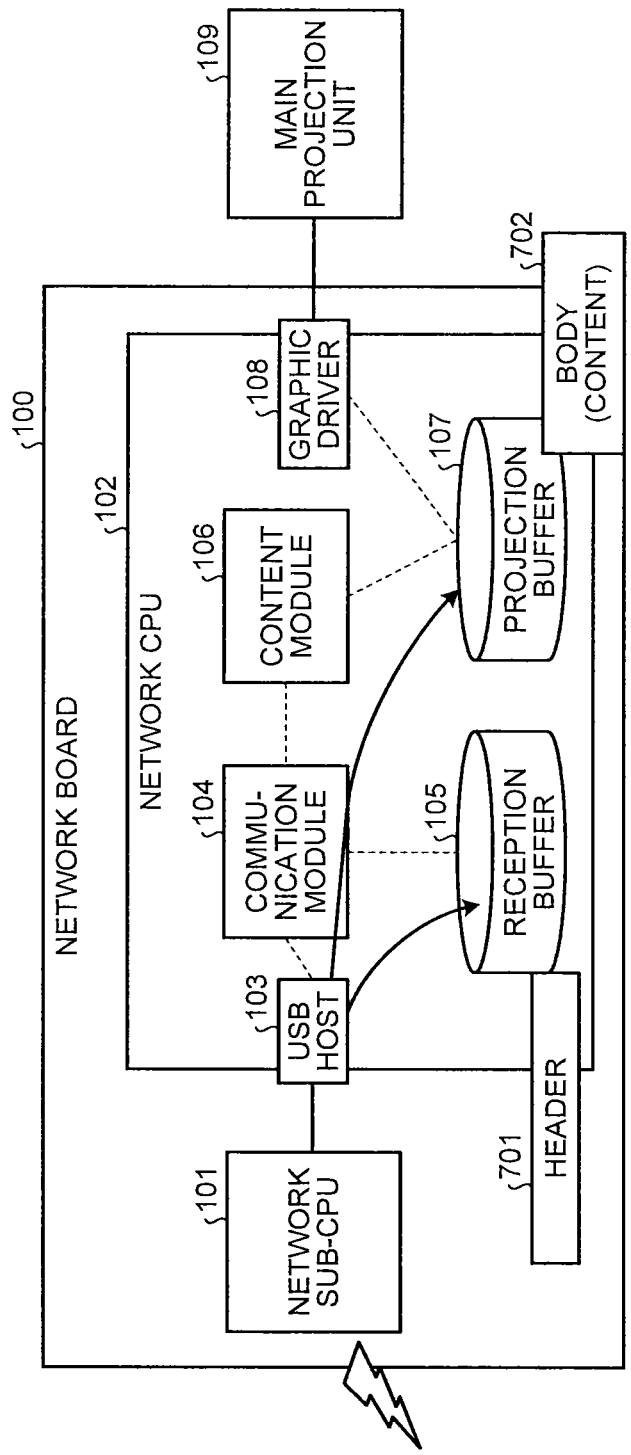
FIG. 7 is a conceptual diagram illustrating an image processing apparatus according to a further embodiment of the present invention.

FIG. 7 is a conceptual diagram illustrating an image processing apparatus according to a further embodiment of the present invention.

The image processing apparatus illustrated in FIG. 7 includes a network sub-CPU 101 that separates a "header" and a "body" for subsequent writing in a reception buffer 105 and a projection buffer 107. The image processing apparatus illustrated in FIG. 7 first writes only the "header" in the reception buffer 105. Then, using a communication module 104, the image processing apparatus analyzes contents of the header and, if the "body" contains "content" data, writes the "content" data in the projection buffer 107.

It is here noted that data written in memory is destroyed when performing the DMA transfer, if the alignment is not adjusted. Dummy data is therefore added to the "header" and the "body", respectively, to thereby adjust the alignment of the data.

FIG. 8 is an exemplary sequence diagram illustrating operation of the image processing apparatus according to the fourth embodiment of the present invention illustrated in FIG. 7.

When receiving data 700 from a PC 200 connected to the network sub-CPU 101 (S1401), the network sub-CPU 101 sends the header to a USB host 103 of a network CPU 102 (S1402).

The USB host 103 sends an incoming notification to the communication module 104 (S1408) and the communication module 104 allocates a buffer for an HTTP header (maximum 2 KB). The communication module 104 then sends a reception request to the USB host 103 (S1409).

The network sub-CPU 101 sends device data (e.g. 16 KB in the case of content) as a payload and a NULL to the USB host 103 (S1404).

The USB host 103 writes the control parameter and the HTTP header out of the device data, in the reception buffer 105 and sends a progress notification (up to the HTTP header) to the communication module 104 (S1410).

The communication module 104 sends a data transfer start notification (file type) to a content module 106 (S1411). Then, the content module 106 sends a data transfer start notification (buffer, size, notification size) to the communication module 104 (S1412) and the content module 106 allocates a buffer.

The communication module 104 sends a buffer change to the USB host 103 (S1413). The network sub-CPU 101 sends the header, payload, and NULL to the USB host 103 (S1405, S1406, S1407).

The device data (e.g. 16 KB in the case of content) as the payload includes the application data header and the HTTP body (still image, moving image).

The USB host 103 writes the application data header and the HTTP body (still image, moving image) out of the device data, in the projection buffer 107 and makes a write notification to the communication module 104 (S1414).

The communication module 104 makes a write notification (starting address, size) to the content module 106 (S1415).

FIG. 9 is an exemplary flowchart illustrating operation of the communication module 104 illustrated in FIG. 8.

The subject of operation of the flowchart illustrated in FIG. 9 is the network CPU 102.

When detecting reception of data (S1501), the network CPU 102 allocates as a reception buffer a size sufficient for header reception (S1502).

The network CPU 102 requests a DMA transfer from the reception buffer 105 (only for the HTTP header: S1503) and analyzes the header (S1504).

The network CPU 102 determines whether the body data is content (S1505). Determining that the body data is content (Yes at S1505), the network CPU 102 allocates the projection buffer 107 using the content module 106 (S1506) and requests a DMA transfer from the projection buffer 107 (for the body: S1507).

Determining that the body data is not content (No at S1505), the network CPU 102 analyzes the body in the communication module 104 and activates functions in the communication module 104 (S1508).

Figure 10A:
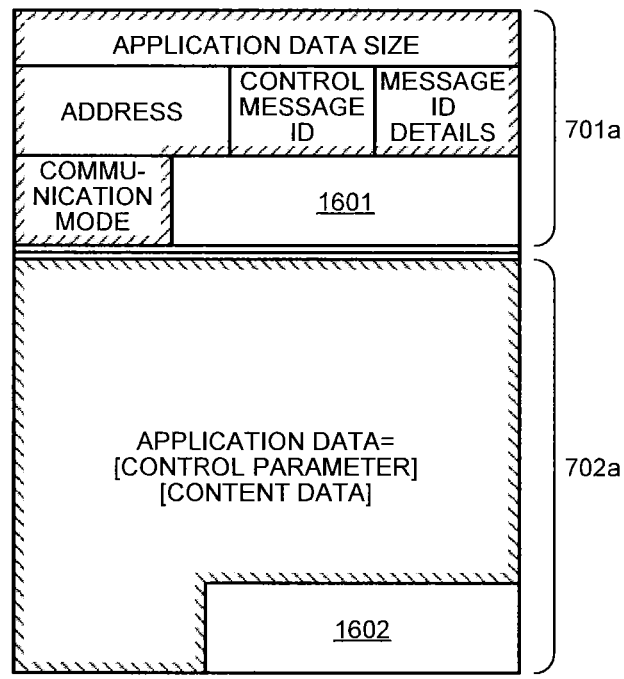
FIGS. 10A and 10B are diagrams illustrating alignment measures.
Figure 10B:
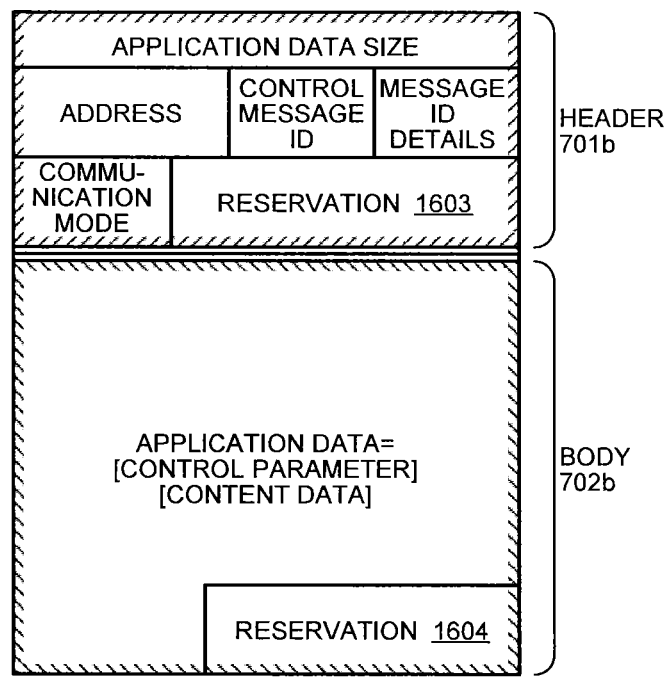

FIGS. 10A and 10B are diagrams illustrating alignment measures.

For the alignment measures, the network sub-CPU 101 performs data conversion before a DMA transfer to the network CPU 102.

FIG. 10A illustrates data as is (before conversion) when received. The data includes a header and a body. The header is in a downwardly protruding data area including an application data size, an address, a control message ID, message ID details, and a communication mode. The body is in a downwardly protruding data area including application data (=[control parameter], [content data]).

FIG. 10B illustrates a condition in which alignment of the "header" and the "body" has been adjusted.

The header is in a rectangular data area including an application data size, an address, a control message ID, message ID details, a communication mode, and reservation. The body is in a rectangular data area including application data (=[control parameter], [content data]) and reservation.

Fifth Embodiment

Figure 11:
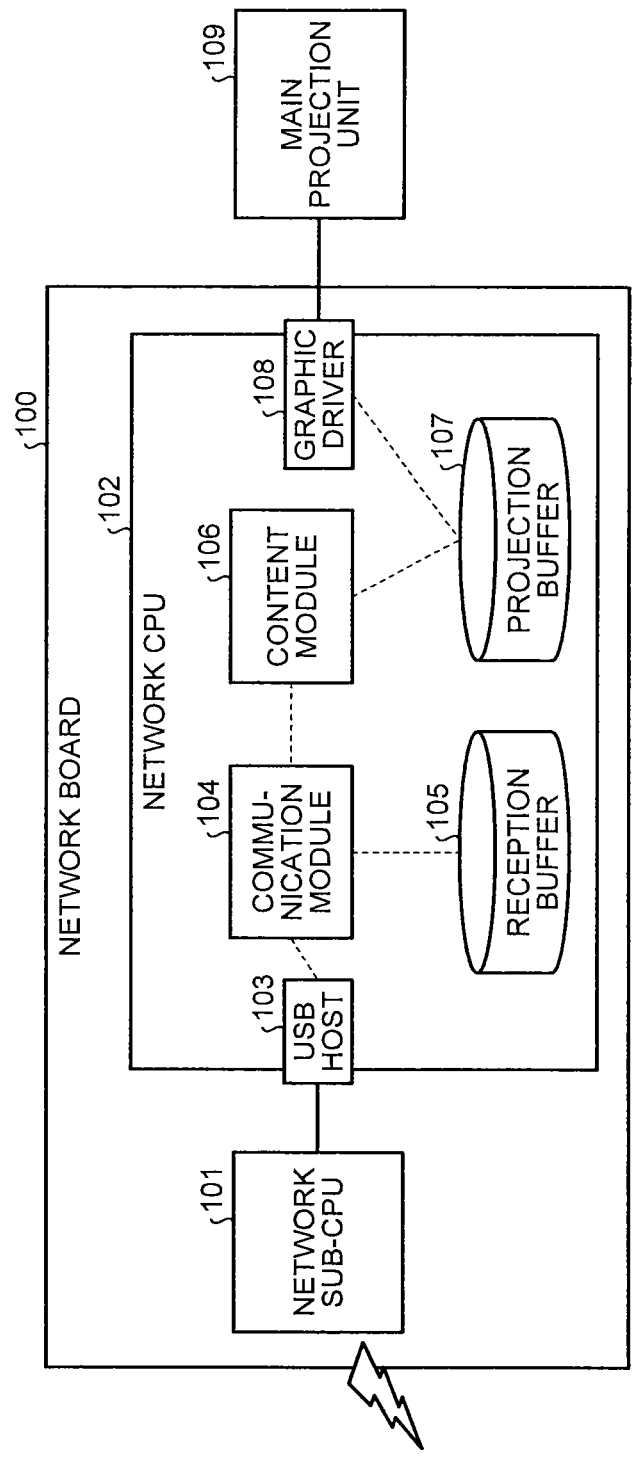
FIG. 11 is a block diagram illustrating an image processing apparatus according to a further embodiment of the present invention.

FIG. 11 is a block diagram illustrating an image processing apparatus according to a further embodiment of the present invention.

The image processing apparatus illustrated in FIG. 11 includes a network board 100 and a main projection unit 109.

The network board 100 includes a network sub-CPU 101 and a network CPU 102.

The network sub-CPU 101 is a piece of hardware that performs protocol control and packet control and partly analyzes received data. Operating as a USB device, the network sub-CPU 101 transfers data to the network CPU 102.

The network CPU 102 is another piece of hardware on which a communication module 104, a content module 106, a USB host 103, and a graphic driver 108 operates.

The communication module 104 is a piece of software that analyzes details of received data and operates application software (hereinafter referred to simply as an application) depending on the contents of the data. The communication module 104 uses a further module as necessary when operating an application.

The content module 106 is another piece of software that outputs image data (content data) written in a projection buffer 107, using the graphic driver 108.

The USB host 103 is still another piece of software that controls a USB device.

The graphic driver 108 is a further piece of software that controls a graphic device.

The main projection unit 109 is a graphic device that projects image data as an optical visible image.

A PC 200 not illustrated is connected to the network sub-CPU 101.

Figure 12:
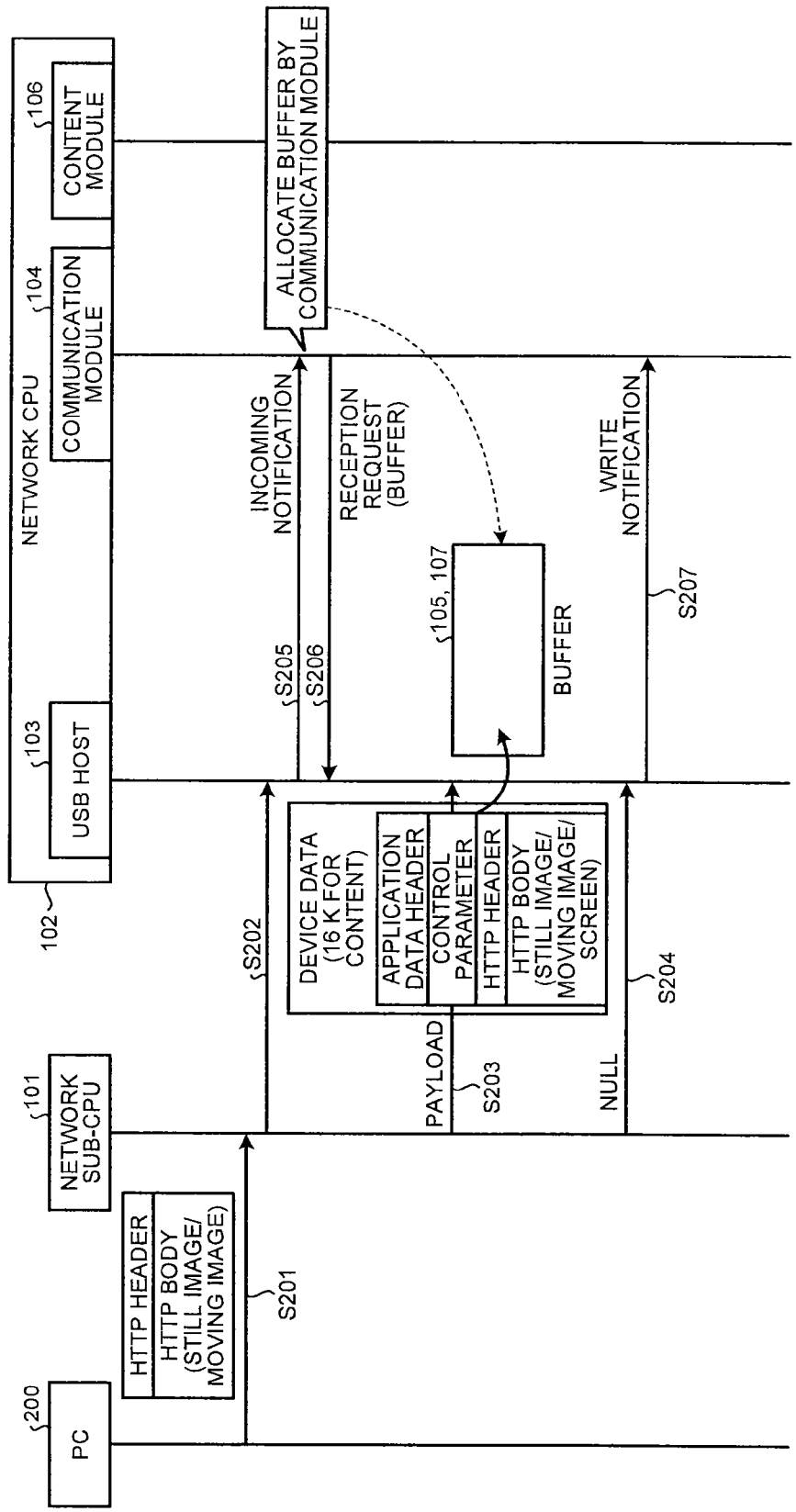
FIG. 12 is a sequence diagram illustrating operation of the image processing apparatus illustrated in FIG. 11.

FIG. 12 is a sequence diagram illustrating operation of the image processing apparatus illustrated in FIG. 11.

When the PC 200 sends data (received data) including a hyper text transfer protocol (HTTP) header and an HTTP body (still image, moving image) to the network sub-CPU 101 (S201), the network sub-CPU 101 sends the received data, payload (device data), and NULL to the USB host 103 of the network CPU 102 (S202, S203, S204).

The USB host 103 makes an incoming notification to the communication module 104 of the network CPU 102 (S205). The communication module 104 of the network CPU 102 allocates a buffer and notifies the USB host 103 (S206). The USB host 103 writes, for example, the header and body of the device data in buffers 105, 107 that have been allocated, and makes a write notification to the communication module 104 (S207).

Figure 13:
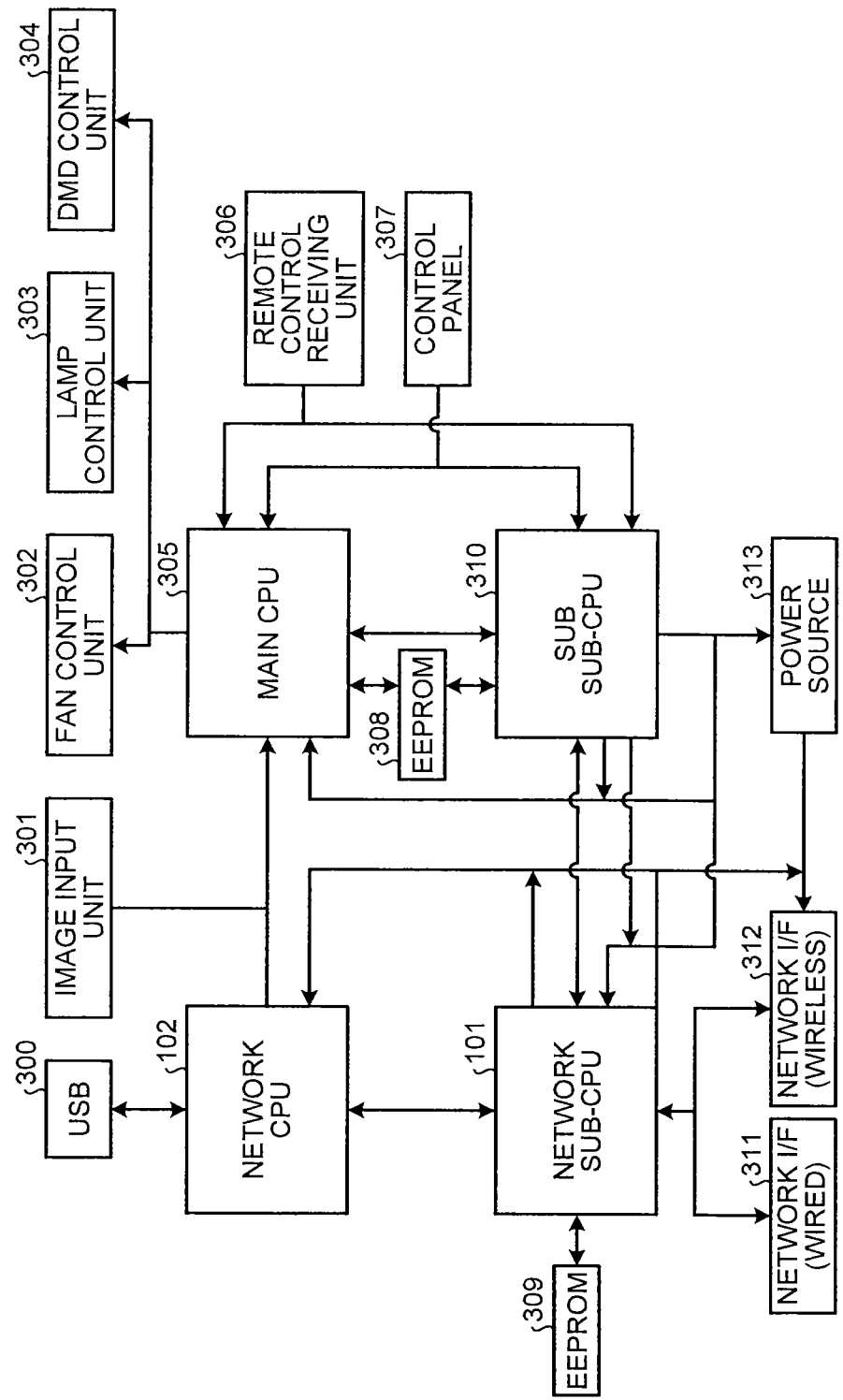
FIG. 13 is a block diagram illustrating a hardware configuration of the image processing apparatus illustrated in FIG. 11.

FIG. 13 is a block diagram illustrating a hardware configuration of the image processing apparatus illustrated in FIG. 11.

The image processing apparatus illustrated in FIG. 13 includes the network sub-CPU 101, the network CPU 102, a USB 300, an image input unit 301, a fan control unit 302, a digital mirror device (DMD) control unit 304, a main CPU 305, a remote control receiving unit 306, a control panel 307, electrically erasable programmable read only memories (EEPROMs) 308, 309, a sub-CPU 310, a network I/F (wired) 311, a network I/F (wireless) 312, and a power source 313.

The main CPU 305 receives an image input signal from an external terminal and the network CPU 102 and projects an image using the DMD control unit 304. The main CPU 305 includes a CPU, a lamp, and a fan and consumes a large amount of electricity.

The network CPU 102 converts input data received from the network via the network sub-CPU 101 and input data from the USB 300 to an image signal and outputs the image signal to the main CPU 305. The network CPU 102 consumes a large amount of electricity.

The network sub-CPU 101 transfers projection data input from the network, to the network CPU 102 and performs control of turning on/off the network CPU 102. The network sub-CPU 101 includes a CPU and wired and wireless local area network (LAN) modules and consumes a small amount of electricity.

The sub-CPU 310 receives a request to turn on power from a key on an operating unit (control panel 307) or a remote control unit (remote control receiving unit 306). The sub-CPU 310 performs control of turning on/off power to the main CPU 305 and the network sub-CPU 101 and consumes a small amount of electricity.

The fan control unit 302 performs control of turning on/off a cooling fan.

A lamp control unit 303 performs control of turning on/off a projection lamp.

The network I/F (wired) 311 is an interface for, for example, an asymmetric digital subscriber line (ADSL) connection or an optical network connection. The network I/F (wireless) 312 is an interface for a wireless network connection.

Figure 14:
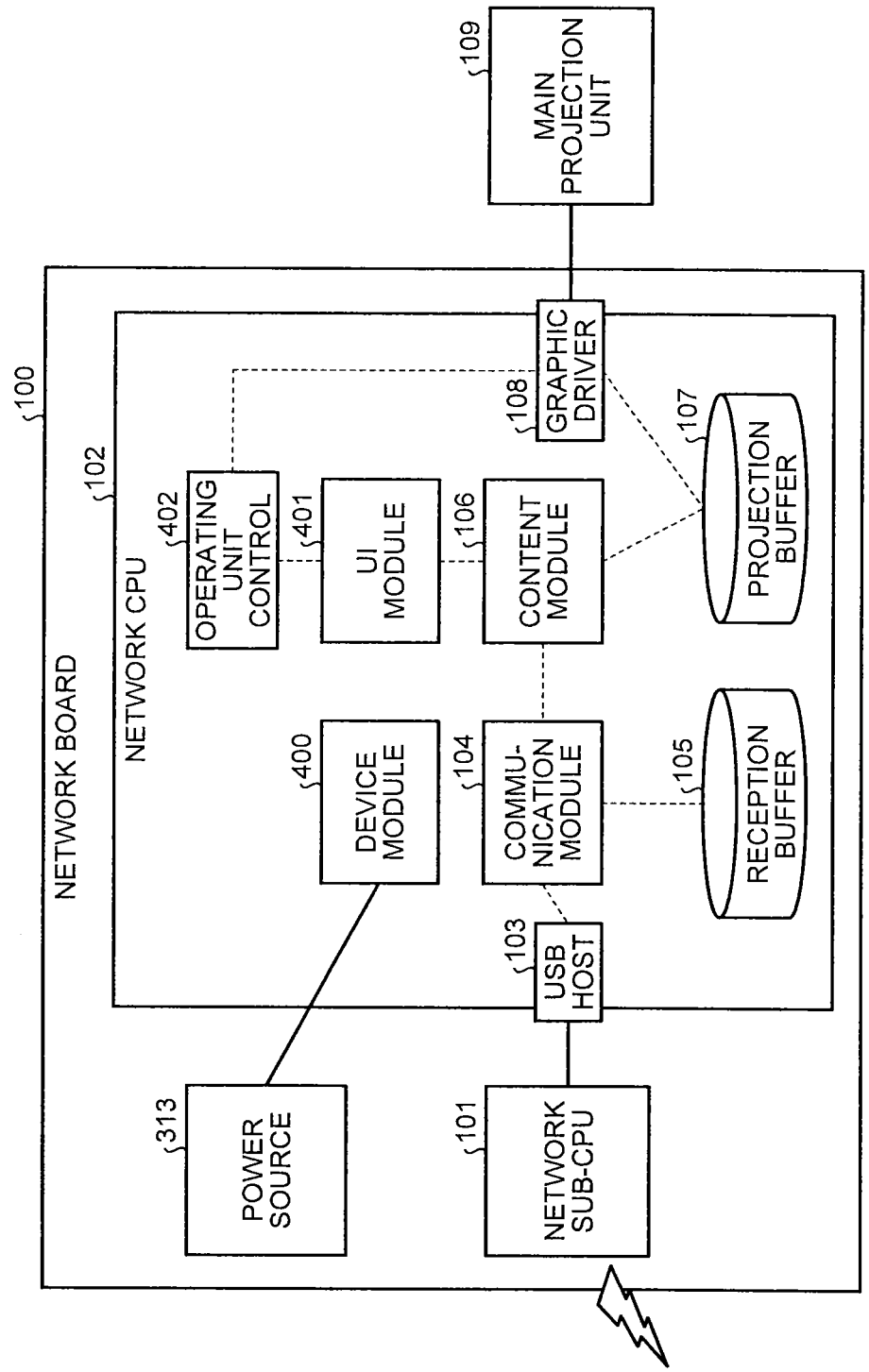
FIG. 14 is a software configuration diagram of a network CPU 102 included in the image processing apparatus illustrated in FIG. 11.

FIG. 14 is a software configuration diagram of the network CPU 102 included in the image processing apparatus illustrated in FIG. 11.

Referring to FIG. 14, the network board 100 includes the network sub-CPU 101, the network CPU 102, and the power source 313.

The network CPU 102 includes the USB host 103, the communication module 104, the reception buffer 105, the projection buffer 107, the graphic driver 108, a device module 400, a user interface (UI) module 401, and operating unit control 402.

Figure 15:
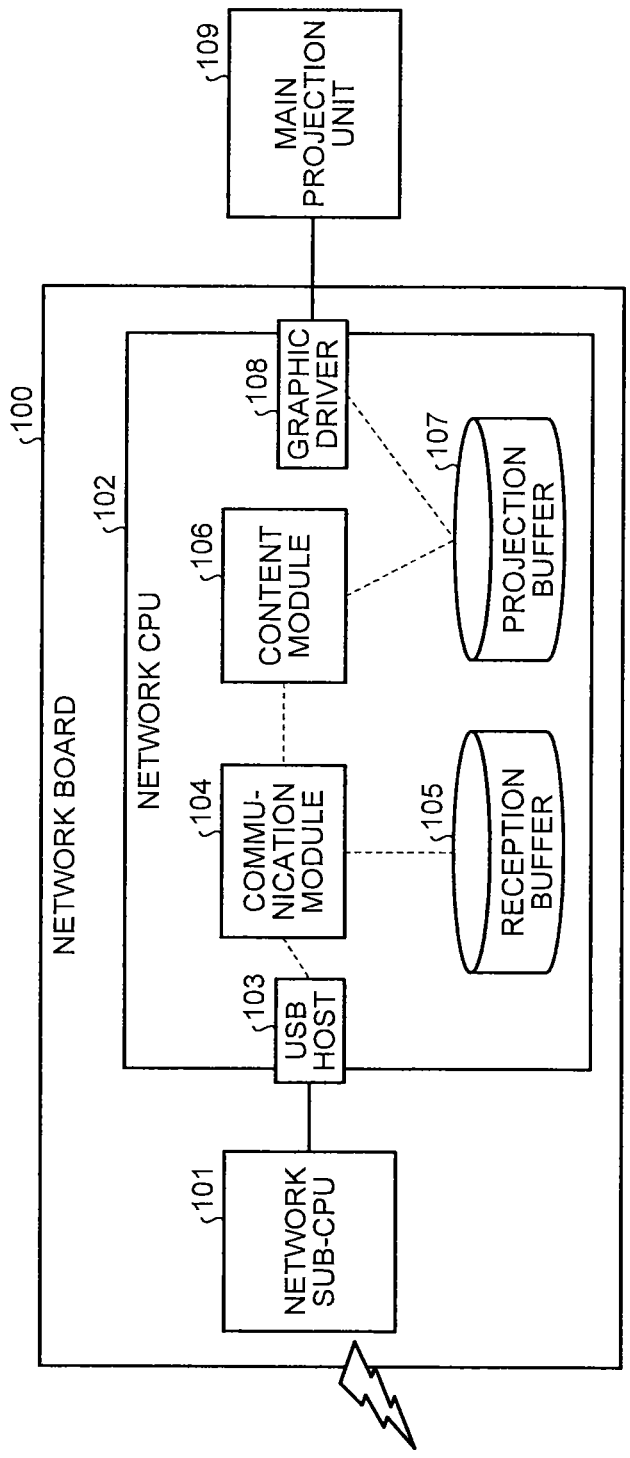
FIG. 15 is a block diagram illustrating part of the network board excerpted from FIG. 14.

FIG. 15 is a block diagram illustrating part of the network board excerpted from FIG. 14.

The network board illustrated in FIG. 15 includes the network sub-CPU 101 and the network CPU 102.

The network CPU 102 includes the USB host 103, the communication module 104, the reception buffer 105, the content module 106, the projection buffer 107, and the graphic driver 108.

FIG. 16 is a conceptual diagram illustrating an internal configuration of the network sub-CPU 101.

FIG. 16 illustrates a condition in which setting information or communication data is transmitted or received as necessary between the network sub-CPU 101 and the network CPU 102 through Peripheral Component Interconnect express (PCIe).

The network CPU 102 includes the USB host 103. The network sub-CPU 101 includes an operating system (OS) 601, a driver 602, transmission control protocol/Internet protocol (TCP/IP) 603, a socket application program interface (API) skeleton 604, a secure socket layer (SSL) 605, a setting application 607, and an auto-reply application 608.

The setting application 607 includes network settings (e.g., filter setting, IP setting, dynamic host configuration protocol (DHCP), domain name server (DNS)), and security settings (IPsec, secure socket layer (SSL)).

In the above, according to the present embodiment, an image processing apparatus that offers high communication speed and high image display speed can be achieved. Additionally, in the present embodiment, only the projection data (image data) is written in the projection buffer 107. This prevents redundant CPU copy from occurring, not adversely affecting performance of the image processing apparatus. Further, the present embodiment can make the most of the DMA transfer, so that a favorable effect can be expected on the performance of the image processing apparatus.

Computer Program

The image processing apparatus according to the embodiments of the present invention described heretofore is achieved by a control program that causes a computer to execute processing. Examples of such a computer include, but are not limited to, a general-purpose computer, such as a personal computer and a workstation. An exemplary case where that the present invention is achieved by a computer program will be described below.

For example, such a possible control program is executed on a computer of an image processing apparatus that includes a network board to analyze received data and output image data and a projection unit to project the image data output from the network board as an optical image, and the control program causes the computer to execute:

(1) dividing, by a division unit, the received data into a header and a body;

performing, by a writing unit, writing in at least one buffer through a DMA transfer; and analyzing, by an analyzing unit, the header, and (2) selecting, by a selection unit, a buffer as a write destination of the DMA transfer according to contents of data contained in the body.

Given a computer environment in which the control program is executable, therefore, the image processing apparatus according to the present invention can be achieved anywhere.

Such a control program may be stored in a computer-readable storage medium.

Storage Medium

Examples of such a storage medium include, but are not limited to, a computer-readable storage medium, such as a compact disc read only memory (CD-ROM), a flexible disc (FD), and a CD recordable (CD-R), a semiconductor memory, such as a flash memory, a random access memory (RAM), a read only memory (ROM), and a ferroelectric memory (FeRAM), and a hard disc drive (HDD).

EFFECTS

The network sub-CPU 101 separates the "header" and the "body" to send to the network CPU 102. Only the "header" portion is first written in the reception buffer 105 and contents are analyzed by the communication module 104. If the "body" contains "content" data, the "content" data is written in the projection buffer 107. During the DMA transfer, data written in memory is destroyed if the alignment is not adjusted. Therefore, dummy data is added to each of the "header" and the "body" to thereby adjust the alignment of the data.

Through the foregoing operation, only the projection data (image data) is written in the projection buffer. Thus, redundant CPU copy does not occur, no adverse effects on performance results, and the DMA transfer can be fully utilized. A favorable effect can be expected on the performance.

The embodiments can provide an image processing method, an image processing apparatus, and a control program that offer high communication speed and high image display speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing method comprising:
dividing data, received at a host, into a header and a body;
analyzing the header of the divided data, the header including information describing a type of data contained in the body;
selecting at least one buffer as a write destination according to the type of data contained in the body based on the analysis of the header of the divided data; and
in response to the selecting the at least one buffer, performing a direct memory access (DMA) transfer, without a redundant CPU copy, of the body received at the host directly to the selected at least one buffer, the host being a DMA transfer source of the DMA transfer, the selected at least one buffer being a DMA transfer destination of the DMA transfer, and the selected at least one buffer having been selected based on the analysis of the header of the divided data.

2. The image processing method according to claim 1, wherein the performing the DMA transfer includes:
if data contained in the body is content data, writing the body data in a projection buffer through the DMA transfer; and
if data contained in the body is a command, writing the body data in a reception buffer through the DMA transfer.

3. The image processing method according to claim 1, further comprising:
adding dummy data to the body to adjust alignment thereof when subjecting the body data to the DMA transfer.

4. An image processing apparatus comprising:
a network board that analyzes data, received at a host, and outputs image data; and
a projector that projects the image data output from the network board as an optical image, wherein
the network board is configured to:
divide the received data into a header and a body;

analyze the header of the divided data, the header including information describing a type of data contained in the body;

select at least one buffer as a write destination according to the type of data contained in the body based on the analysis of the header of the divided data; and in response to the selecting the at least one buffer, perform a direct memory access (DMA) transfer, without a redundant CPU copy, of the body received at the host directly to the selected at least one buffer, the host being a DMA transfer source of the DMA transfer, the selected at least one buffer being a DMA transfer destination of the DMA transfer, and the selected at least one buffer having been selected based on the analysis of the header of the divided data.

5. The image processing apparatus according to claim 4, wherein the network board is configured to:

if data contained in the body is content data, write the body data in a projection buffer through the DMA transfer; and if data contained in the body is a command, write the body data in a reception buffer through the DMA transfer.

6. The image processing apparatus according to claim 4, wherein the network board is configured to add dummy data to the body to adjust alignment thereof when subjecting the body data to the DMA transfer.

7. A computer program product comprising a non-transitory computer-usable medium having computer-readable program codes embodied in the medium and for a computer of an image processing apparatus, the image processing apparatus including a network board that analyzes data, received at a host, and outputs image data; and a projector that projects the image data output from the network board as an optical image, wherein the program codes when executed cause the computer to execute:

dividing the received data into a header and a body;

analyzing the header of the divided data, the header including information describing a type of data contained in the body;

selecting at least one buffer as a write destination according to the type of data contained in the body based on the analysis of the header of the divided data; and in response to the selecting the at least one buffer, performing a direct memory access (DMA) transfer, without a redundant CPU copy, of the body received at the host directly to the selected at least one buffer, the host being a DMA transfer source of the DMA transfer, the selected at least one buffer being a DMA transfer destination of the DMA transfer, and the selected at least one buffer having been selected based on the analysis of the header of the divided data.

8. The computer program product according to claim 7, wherein the performing the DMA transfer includes:

if data contained in the body is content data, writing the body data in a projection buffer through the DMA transfer; and if data contained in the body is a command, writing the body data in a reception buffer through the DMA transfer.

9. The computer program product according to claim 7, wherein the program codes when executed cause the computer to further execute:

adding dummy data to the body to adjust alignment thereof when subjecting the body data to the DMA transfer.

* * * * *